(12) United States Patent
Hasunuma

(10) Patent No.: US 8,800,959 B2
(45) Date of Patent: Aug. 12, 2014

(54) FLOW-RATE CONTROL VALVE

(75) Inventor: Masahiro Hasunuma, Gyoda (JP)

(73) Assignee: Surpass Industry Co., Ltd., Gyoda-Shi (JP)

( * ) Notice: Subject to any disclaimer, the term of this patent is extended or adjusted under 35 U.S.C. 154(b) by 278 days.

(21) Appl. No.: 12/458,152

(22) Filed: Jul. 1, 2009

(65) Prior Publication Data

US 2010/0001221 A1   Jan. 7, 2010

(30) Foreign Application Priority Data

Jul. 7, 2008  (JP) .................................. 2008-177265

(51) Int. Cl.
*F16K 31/02* (2006.01)

(52) U.S. Cl.
USPC ............ 251/129.04; 251/129.11; 251/129.12; 251/122; 251/335.3; 137/554; 137/556

(58) Field of Classification Search
USPC .................. 251/122, 129.11, 129.12, 129.13, 251/129.04, 129.02, 335.3; 137/553, 554, 137/556, 556.3
See application file for complete search history.

(56) References Cited

U.S. PATENT DOCUMENTS

| 3,488,030 | A | * | 1/1970 | Hulme et al. ............ 251/129.12 |
| 4,779,642 | A | * | 10/1988 | Wood et al. ................. 137/487.5 |
| 5,168,200 | A | * | 12/1992 | Payne ............................ 318/282 |
| 6,092,782 | A | * | 7/2000 | Yamada et al. ........... 251/129.04 |
| 6,230,738 | B1 | * | 5/2001 | Watanabe et al. ............. 137/486 |
| 6,321,776 | B1 | * | 11/2001 | Pratt et al. ..................... 137/312 |
| 6,764,060 | B2 | * | 7/2004 | Fukano et al. ........... 251/129.12 |
| 7,988,124 | B2 | * | 8/2011 | Watanabe et al. ........ 251/129.12 |
| 8,292,262 | B2 | * | 10/2012 | Hasunuma et al. ...... 251/129.05 |
| 2003/0006389 | A1 | | 1/2003 | Fukano et al. |
| 2006/0238039 | A1 | * | 10/2006 | Niedermeyer et al. ..... 310/49 R |

FOREIGN PATENT DOCUMENTS

| GB | 2 328 004 | | 2/1999 |
| JP | S59-13770 | | 1/1984 |
| JP | S59-133770 | | 1/1984 |
| JP | 07-38843 | | 7/1995 |
| JP | 09-089139 | | 3/1997 |
| JP | 11-118067 | | 4/1999 |
| JP | 2003-194250 | A | 7/2003 |
| JP | 2004-324833 | A | 11/2004 |
| JP | 2008-133928 | A | 6/2008 |

OTHER PUBLICATIONS

European Search Report for EP Appln No. 09163323.0, filed Feb. 20, 2013.
Japanese Office Action in corresponding Japanese Patent Application No. 2008-177265, issued on Mar. 26, 2013.

* cited by examiner

*Primary Examiner* — John K Fristoe, Jr.
*Assistant Examiner* — Marina Tietjen
(74) *Attorney, Agent, or Firm* — Edwards Wildman Palmer LLP; James E. Armstrong, IV; George N. Chaclas

(57) ABSTRACT

The present invention provides a flow-rate control valve that allows for manufacturing cost reduction and has a compact size with improved ease of maintenance. The flow-rate control valve includes a lower casing provided with a channel that leads a liquid and a fluid and with a valve seat, a valve body that controls, in conjunction with the valve seat, the flow rate of the liquid and the fluid that pass through the channel, a reciprocating drive part that moves the valve body closer to or away from the valve seat, and an upper casing that houses the reciprocating drive part.

4 Claims, 9 Drawing Sheets

FLOW-RATE CONTROL VALVE

BACKGROUND OF THE INVENTION

1. Field of the Invention

The present invention relates to flow-rate control valves.

This application is based on Japanese Patent Application No. 2008-177265, the content of which is incorporated herein by reference.

2. Description of Related Art

Conventionally, application of needle valves is known in the structures of valves for controlling the flow rates of liquids including chemical solutions.

Also known is a technique wherein a valve as mentioned above is provided with a stepping motor that drives and rotates a shaft body and also with a converting mechanism that converts the rotation of the shaft body into advancing/retracting movement of the shaft body to render the valve remotely controllable (see, e.g., Japanese Unexamined Utility Model Application, Publication No. Hei07-038843).

The converting mechanisms include one with an externally threaded shaft body and an internally threaded slider.

Valves using such a converting mechanism require an increased number of components as well as an increased man-hours for assembly of the valves, which not only leads to increased manufacturing costs of the valves but also to impairment of ease of maintenance.

BRIEF SUMMARY OF THE INVENTION

The present invention was made to overcome the foregoing problems, and it is an object of the invention to provide a flow-rate control valve that allows for manufacturing cost reduction, improved ease of maintenance, as well as adaptability to space saving with an ability to be manufactured in a compact size.

In order to achieve the above object, the present invention provides the following solutions.

An aspect of the flow-rate control valve of the present invention relates to a flow-rate control valve including: a lower casing including a channel that leads a liquid and a fluid, and a valve seat; a valve body that controls, in conjunction with the valve seat, the flow rate of the liquid and the fluid that pass through the channel; a reciprocating drive part that moves the valve body closer to or away from the valve seat; and an upper casing housing the reciprocating drive part.

According to the above aspect, the valve body is driven and controlled by the reciprocating drive part in a direction toward and away from the valve seat. Accordingly, the number of components of the flow-rate control valve and the size of the valve are reduced compared with the case of using the method where the rotary driving force produced by, e.g., a stepping motor is converted into linear movement of the valve body.

In the above aspect, the valve body desirably includes: an insertion hole that receives a shaft body extending from the reciprocating drive part; and a communication portion linking the inside of the insertion hole with the air.

According to the above aspect, the gas of the liquid or fluid that has permeated through the valve body and entered the insertion hole is easily released into the air through the communication portion.

In the above aspect, it is desired that the reciprocating drive part includes: a shaft body extending toward the valve body; and a substantially disc-shaped sliding part extending in a direction that crosses the shaft body, that a middle casing including a substantially tubular guide portion is provided between the lower casing and the upper casing, the guide portion being fitted with the reciprocating drive part to movably support the shaft body and the sliding part in a direction toward and away from the valve seat, and that the guide portion includes a portion on which the sliding part slides, the portion being provided independently of the middle casing.

According to the above aspect, since the valve body is driven by the shaft body that is movably supported by the guide portion and the sliding part, the valve body is prevented from moving in a direction other than the direction toward and away from the valve seat while being caused to move in the direction to approach and recede from the valve seat. Thus, the flow rate of liquids or fluids is easily and reliably controlled with the flow-rate control valve at a desired level of accuracy.

Meanwhile, for instance, in the case where an integrally formed middle casing is used, the portion of the guide portion on which the sliding part slides is provided independently of the middle casing and has a substantially tubular shape, and irregularity or deformation due to, e.g., thinning of the material is thus less likely to occur. Accordingly, the movement of the valve body is not hindered in the direction toward and away from the valve seat, so that the flow rate of liquids or fluids is easily and reliably controlled with the flow-rate control valve at a desired level of accuracy.

In the above aspect, a detection part that detects the valve body as the valve body comes close to the valve seat is desirably provided.

According to the above aspect, the valve body is detected when the valve body is in close proximity to the valve seat, i.e., is at a position where a predetermined gap still exists between the valve body and the valve seat. Hence, the position to which the valve body is controlled can be calibrated with the valve body brought close to the valve seat when the detection part detects the valve body. At this point, a liquid or fluid more than necessary is prevented from passing through the flow-rate control valve.

Meanwhile, since the valve body is detected in the vicinity of the valve seat, contact of the valve body with the valve seat is avoided at the time of detecting the valve body by the detection part. Thus, it is possible to prevent deformation of the valve body and the valve seat due to such contact, and reliable and reproducible flow-rate control becomes possible with the flow-rate control valve.

In the flow-rate control valve of the present invention, the valve body is driven and controlled by the reciprocating drive part in the direction toward and away from the valve seat; therefore, the number of components of the flow-rate control valve is reduced compared with the case of using the method where the rotary driving force produced by, e.g., a stepping motor is converted into the linear movement of the valve body. Hence, the present invention provides an effect that manufacturing cost reduction, as well as improved ease of maintenance, is achieved while the valve is downsized, resulting in adaptability to space saving.

DETAILED DESCRIPTION OF THE INVENTION

First Embodiment

A flow-rate control valve according to a first embodiment of the present invention is described below with reference to FIGS. 1 to 11.

Figure 1:
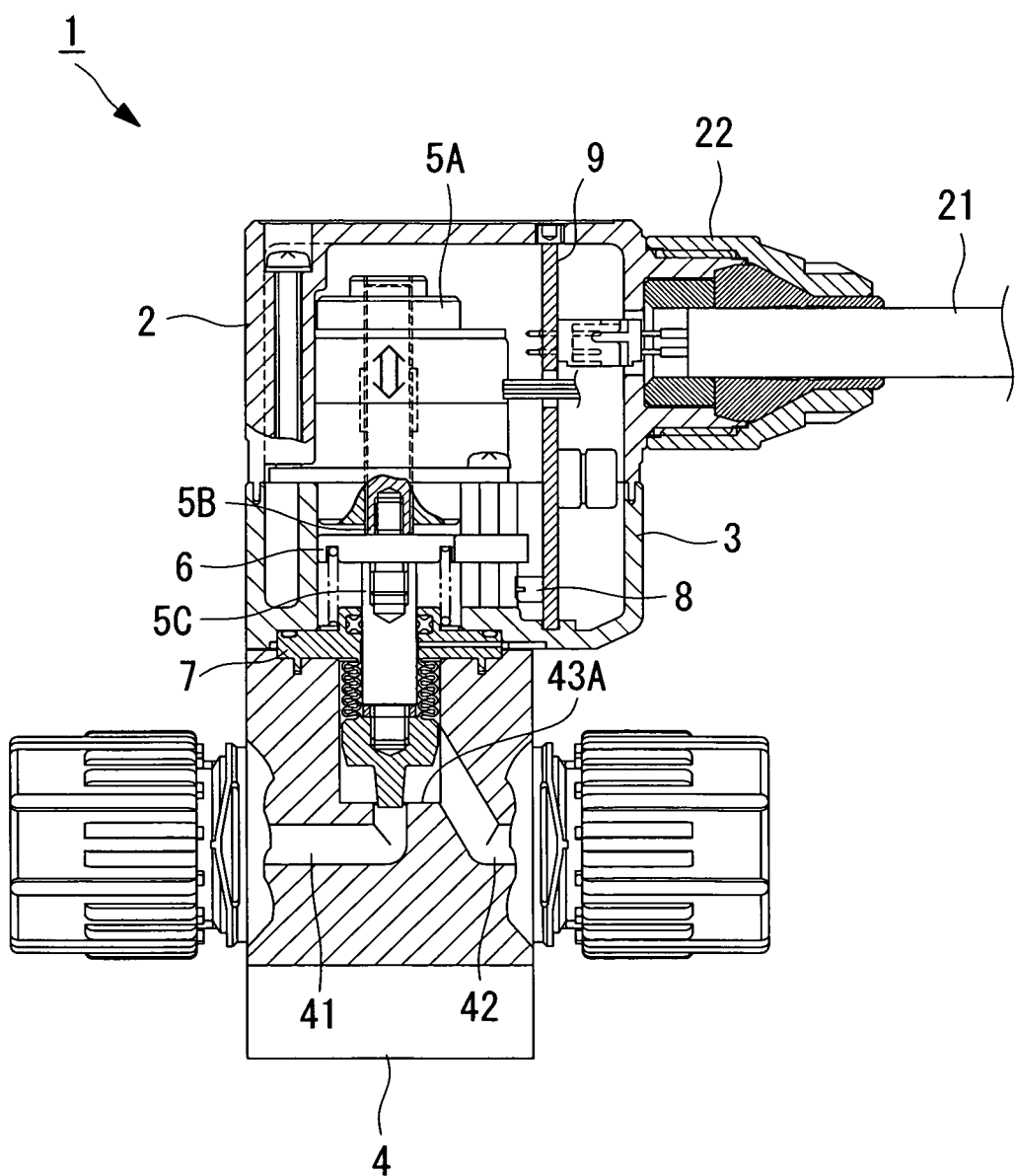
FIG. 1 is a cross-sectional view illustrating the overall structure of a flow-rate control valve according to a first embodiment of the present invention.
Figure 2:
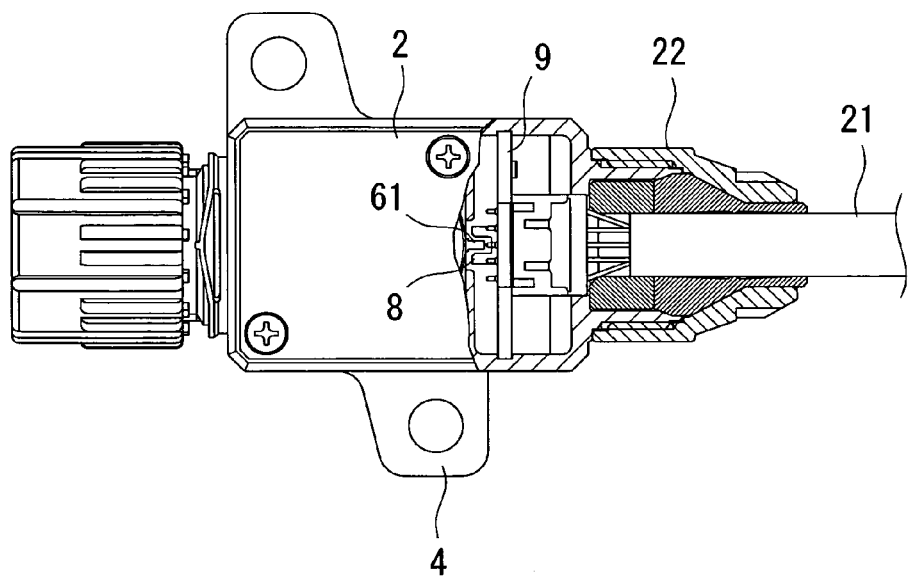
FIG. 2 is a top view illustrating the structure of the flow-rate control valve of FIG. 1.

FIG. 1 is a cross-sectional view illustrating the overall structure of the flow-rate control valve according to the present embodiment. FIG. 2 is a top view illustrating the structure of the flow-rate control valve of FIG. 1.

The present embodiment is described on a case in which a flow-rate control valve 1 of the present invention is applied to a control valve of a semiconductor manufacturing apparatus so as to control the flow rate of chemical solutions.

The flow-rate control valve 1 of the present embodiment is not limited to control valves used for controlling the flow rate of chemical solutions for use in the manufacture of semiconductors and may be applied, without particular limitation, to control valves for controlling the flow rate of other liquids.

As shown in FIGS. 1 and 2, the flow-rate control valve 1 includes an upper cover (upper casing) 2, a middle cover (middle casing) 3, and a lower cover (lower casing) 4 that form the outer shape of the flow-rate control valve 1, with the internal space defined by the covers 2, 3, and 4 housing a linear stepping motor (reciprocating drive part) 5A, shafts (shaft body) 5B and 5C, a slider (sliding part) 6, a valve body 7, a sensor (position detection part) 8, and a substrate 9.

Figure 3:
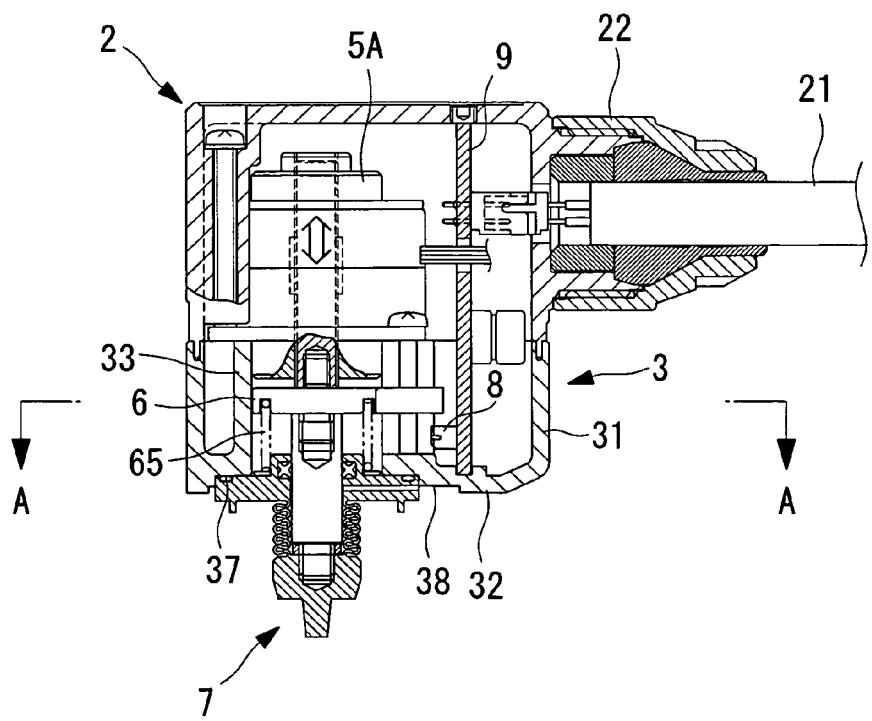
FIG. 3 is a partial cross-sectional view illustrating the structures of an upper cover and a middle cover of FIG. 1.

FIG. 3 is a partial cross-sectional view illustrating the structures of the upper cover and the middle cover of FIG. 1.

As shown in FIGS. 1 and 3, the upper cover 2 is combined with the middle cover 3 to thereby jointly define a space inside, and the linear stepping motor 5A, the substrate 9, and the like are housed in the space. The upper cover 2 is provided on its side surface with wiring for use in drive and control of the linear stepping motor 5A as well as a coupling portion 22 to receive a cable 21 housing the wires to be connected to the sensor 8.

Figure 4:
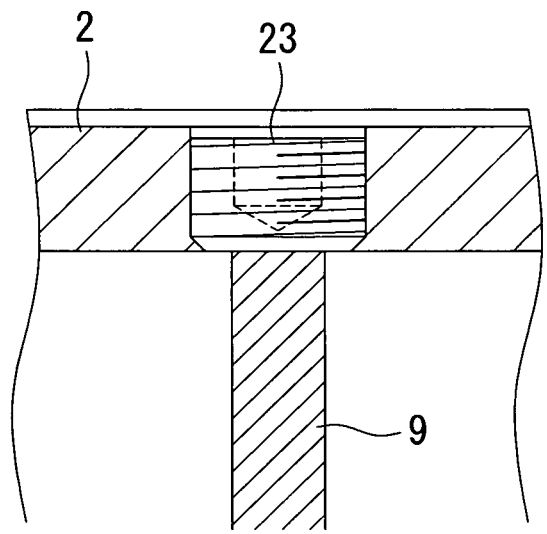
FIG. 4 is a partial enlarged view illustrating the structure of the upper cover of FIG. 3.

FIG. 4 is a partial enlarged view illustrating the structure of the upper cover of FIG. 3.

A screw 23 is provided on the upper surface (a surface on the upper side of FIG. 3) of the upper cover 2.

The screw 23 serves as a fastener screwed on the upper surface of the upper cover 2 and is disposed at a position in which the lower end of the screw 23 contacts the upper end of the substrate 9.

In this manner, the substrate 9 is pressed downward by the screw 23 at all times, so that the substrate 9 and the sensor 8 on the substrate 9 are stably installed in place relative to the upper cover 2 and the middle cover 3.

Consequently, this structure allows the position at which the sensor 8 detects the slider 6 and a fitting portion 73, i.e., a mechanical zero point, to be set stable.

Figure 5:
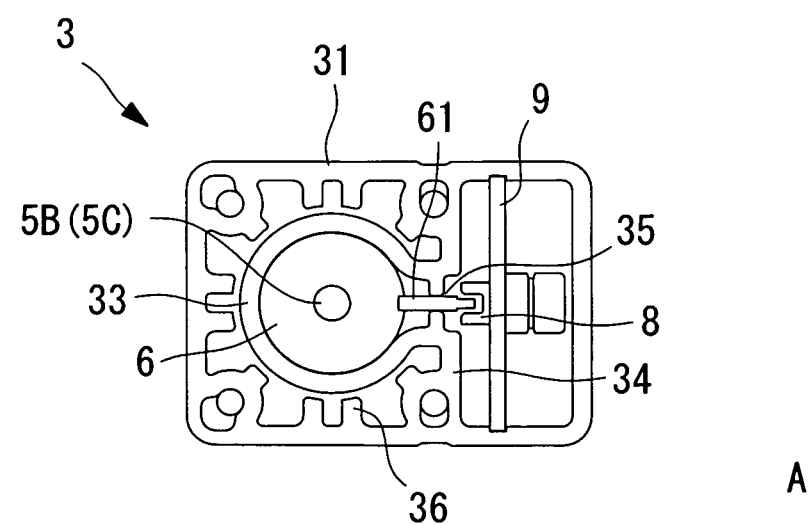
FIG. 5 is a cross-sectional view taken along line A-A of FIG. 3, illustrating the structure of the middle cover.

FIG. 5 is a cross-sectional view taken along line A-A of FIG. 3, illustrating the structure of the middle cover 3.

The middle cover 3 is combined with the upper cover 2 to jointly define a space to house the shafts 5B and 5C, the slider 6, the substrate 9, the sensor 8, and the like.

As shown in FIGS. 3 and 5, the middle cover 3 has a substantially quadrangular outer wall 31 forming the outer shape, a bottom plate 32 provided on the side of the lower cover 4, and a substantially cylindrical guide 33 provided on the inner side of the outer wall 31.

A partition 34 is provided to divide the internal space of the outer wall 31 into an area in which the guide 33 is disposed (an area on the left of FIG. 3) and an area in which the substrate 9 and the sensor 8 are disposed (an area on the right of FIG. 3). The partition 34 is provided with a slit 35 that introduces a protrusion 61 of the slider 6 to be described later. The slit 35 is formed to provide a groove that extends along the direction of extension of the shafts 5B and 5C.

A plurality of inwardly projecting ribs 36 are provided on the inner peripheral surfaces of the outer wall 31 in the area in which the guide 33 is disposed. The ribs 36 and the guide 33 are arranged with gaps formed therebetween.

The guide 33 is provided on the upper surface, i.e., a surface on the side of the upper cover 2, of the bottom plate 32, while a recess 37 to receive a flange 71 of the valve body 7 is provided on the lower surface, i.e., a surface on the side of the lower cover 4, of the bottom plate 32. An exhaust groove 38 is provided outward from the recess 37.

The guide 33 is a substantially cylindrical member that extends from the bottom plate 32 toward the upper cover 2. The guide 33 receives therein a portion of the linear stepping motor 5A, the shafts 5B and 5C, the slider 6, and a spring 65 to be described later.

The guide 33 is provided with the slit 35 through which the protrusion 61 of the slider 6, which is described later, is introduced.

Figure 6:
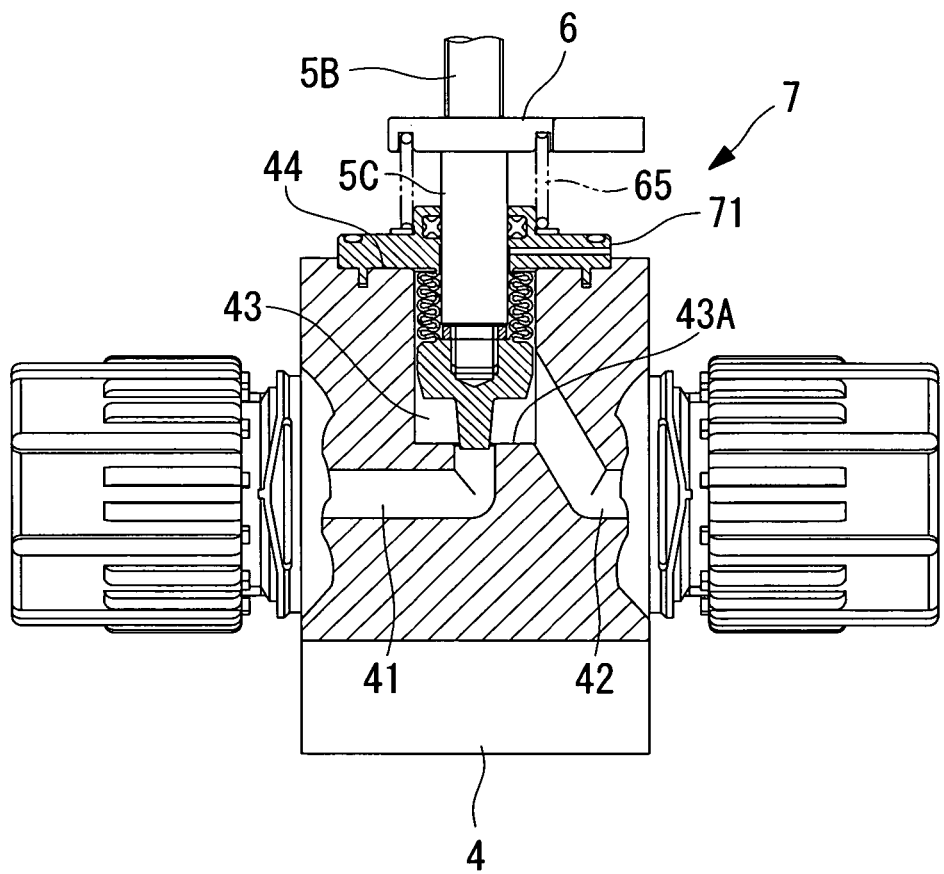
FIG. 6 is a schematic view illustrating the structures of the middle cover and a lower cover of FIG. 1.

FIG. 6 is a schematic view illustrating the structures of the middle cover and the lower cover of FIG. 1.

As shown in FIGS. 1 and 6, the lower cover 4 is disposed such that the valve body 7 is interposed between the lower cover 4 and the middle cover 3. The lower cover 4 is provided with a valve seat 43A that acts to control the flow rate of chemical solutions in conjunction with the valve body 7.

As shown in FIG. 6, the lower cover 4 includes an inlet channel 41 that lets chemical solutions in, an outlet channel 42 that drains the chemical solutions out, a valve chamber 43 that houses a portion of the valve body 7, and a recessed seal surface 44 provided on a surface of the lower cover 4, which surface faces the middle cover 3.

As shown in FIG. 6, the inlet channel 41 extends substantially horizontally (rightward and leftward in FIG. 6) from a side surface of the lower cover 4, bends upward (upward in FIG. 6) from a position below the valve chamber 43, and opens into the valve chamber 43 from below.

The outlet channel 42 slopes down from a side surface of the valve chamber 43 and then extends substantially horizontally to be opened on a side surface of the lower cover 4.

This structure allows the centers (centerlines) of the substantially horizontally extending portions of the inlet channel 41 and of the outlet channel 42 to be substantially aligned to each other. Thus, conduits connecting to the inlet channel 41 and to the outlet channel 42 are disposed at a substantially fixed height, which facilitates handling of the conduits.

As shown in FIG. 6, the valve chamber 43 is a hole that extends downward from the upper surface, i.e., a surface facing the middle cover 3, of the lower cover 4 to receive a portion of the valve body 7 therein.

The inlet channel 41 opens on the bottom surface of the valve chamber 43, such that the bottom surface of the valve chamber 43 is configured as the valve seat 43A for controlling the flow rate of chemical solutions in conjunction with the valve body 7.

Meanwhile, the outlet channel 42 opens on the sidewall that corresponds to the cylindrical surface of the columnar valve chamber 43.

As shown in FIG. 6, the seal surface 44 is recessed to receive the flange 71 of the valve body 7, such that the seal surface 44 configures a seal structure together with the flange 71 to isolate the inside of the valve chamber 43 from the outside thereof.

The seal surface 44 is provided with an annular groove centered on the valve chamber 43. A ridge provided annularly on the flange 71 fits in the groove, thereby forming the aforementioned seal structure.

As shown in FIGS. 1 and 3, the linear stepping motor 5A allows the shaft 5B to pass therethrough so as to cause the shaft 5B to move vertically (upward and downward in FIG. 3). The linear stepping motor 5A is disposed at the upper end of the guide 33 of the middle cover 3.

Further, a columnar protrusion is provided on the lower surface (a surface on the lower side of FIG. 3), i.e., a surface facing the middle cover 3, of the linear stepping motor 5A, which protrusion is fitted with the guide 33.

In this manner, an axis is accurately set throughout the middle cover 3 and the motor 5A. In other words, the central axis of the guide 33 of the middle cover 3 is substantially aligned with the central axis of the motor 5A.

Meanwhile, the linear stepping motor 5A is fed with drive/control signals through the wires housed in the cable 21.

Note that the linear stepping motor 5A may be, but not limited to, a known motor.

As shown in FIGS. 1 and 3, the shaft 5B is a rod-like member that extends from the linear stepping motor 5A toward the valve body 7 through the inside of the guide 33. The shaft 5B communicates the driving force produced by the linear stepping motor 5A to the valve body 7.

The slider 6 is provided at the lower end of the shaft 5B.

As shown in FIGS. 1 and 3, the shaft 5C is a rod-like member that extends from the slider 6 toward the valve body 7 through the inside of the guide 33. The shaft 5C communicates, like the shaft 5B, the driving force produced by the linear stepping motor 5A to the valve body 7.

The shaft 5C is desirably made of a corrosion-proof material. Thus, the shaft 5C is protected from corrosion even if the evaporating gas of a chemical solution (e.g., a corrosive gas) permeates through a folded section 72, which is described later, to contact the shaft 5C.

Figure 7:
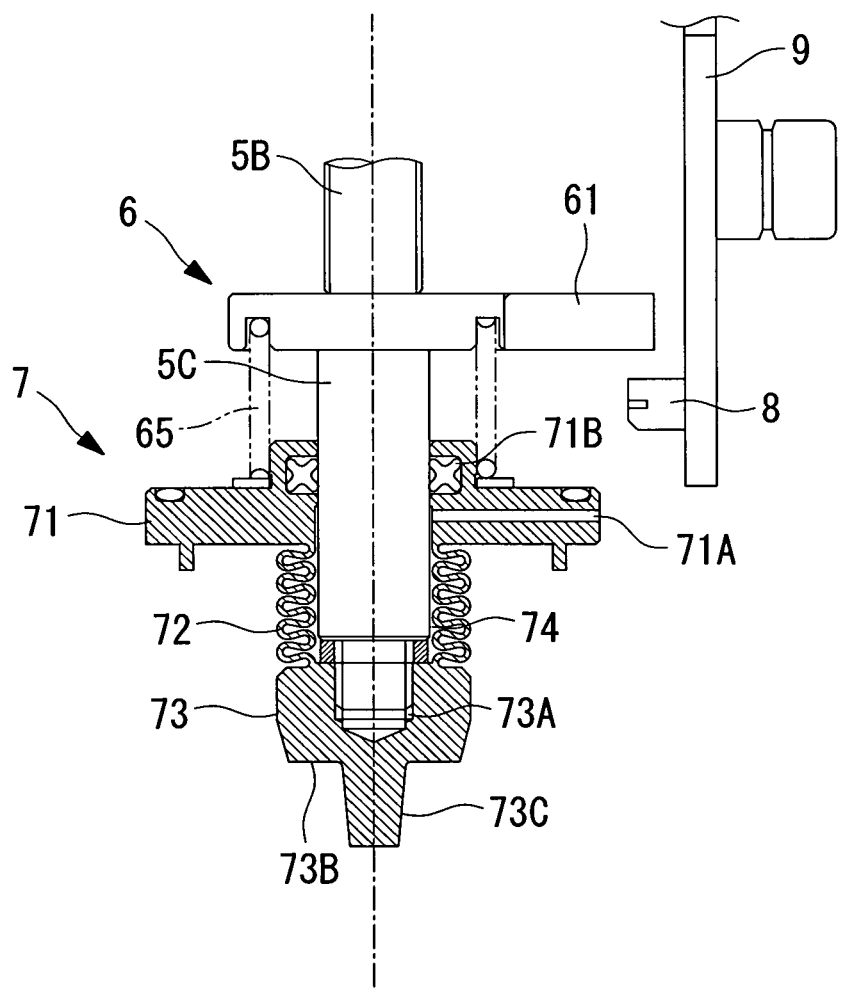
FIG. 7 is a partial enlarged view illustrating the structures of a slider and a valve body of FIG. 1.

FIG. 7 is a partial enlarged view illustrating the structures of the slider and the valve body of FIG. 1.

As shown in FIGS. 3 and 7, the slider 6 is a substantially disc-shaped member that is fitted between the shaft 5B and the shaft 5C. The circumferential surface of the slider 6 is movable vertically (upward and downward in FIG. 3) while in contact with the inner peripheral surface of the guide 33. The circumferential surface of the slider 6 thus sliding on the inner peripheral surface of the guide 33 prevents the installation positions of the shafts 5B and 5C from deviating from the central axis of the guide 33.

The slider 6 is provided with the rod-like protrusion 61 that extends radially outward from the substantially disc-shaped circumferential surface. As shown in FIG. 5, the protrusion 61 is inserted through the slit 35 that is provided in the guide 33 and the partition 34, and the tip of the protrusion 61 is extended up to the position where the sensor 8 is disposed.

As shown in FIGS. 3 and 7, the spring 65 is interposed between the slider 6 and the flange 71 of the valve body 7. The spring 65 urges the slider 6 in such a direction that the slider 6 is drawn apart from the flange 71. In other words, the spring 65 urges the fitting portion 73 of the valve body 7, the fitting portion 73 being coupled to the slider 6 through the shaft 5C, in a direction away from the valve seat 43A of the valve chamber 43.

The spring 65 thus disposed keeps, for example, the linear stepping motor 5A and the shaft 5B meeting each other in a predetermined direction at all times. Accordingly, it is possible to curb hysteresis to be generated due to the repetitive vertical movement of the shafts 5B and 5C to a minimum extent, hence preventing degradation in accuracy of positional control of the fitting portion 73. Meanwhile, force is applied from a chemical solution to the fitting portion 73 and the shaft 5B in substantially the same direction as that in which the urging force of the spring 65 works; therefore, the urging force of the spring 65 will not be damped by the force applied from the chemical solution.

Further, when the fitting portion 73 is in close proximity to the valve seat 43A, the spring 65 is contracted most to exert great urging force; this structure provides for highly accurate positional control of the fitting portion 73. In other words, the flow-rate control valve 1 is controlled at a high degree of accuracy in low flow-rate conditions.

As shown in FIGS. 6 and 7, the valve body 7 configures a throttle structure for controlling the flow rate of chemical solutions that pass through the flow-rate control valve 1 in conjunction with the valve seat 43A of the valve chamber 43.

The valve body 7 includes, in the order from the upper cover 2 side to the lower cover 4 side, the flange 71, the folded sections 72, and the fitting portion 73. The valve body 7 is further provided with an insertion hole 74 to receive the shaft 5C.

The present embodiment is described on an example where the flange 71, the folded sections 72, and the fitting portion 73 are integrally formed.

As shown in FIGS. 3, 6, and 7, the flange 71 is a substantially disc-shaped portion that is disposed at a position closest to the upper cover 2 in the valve body 7, i.e., a position between the recess 37 in the middle cover 3 and the seal surface 44 of the lower cover 4. The flange 71, together with the middle cover 3 and the lower cover 4, configures a seal structure to hermetically seal the valve chamber 43.

The flange 71 is provided at its substantial center with a through hole which configures a portion of the insertion hole 74, and is also provided with a communication portion 71A which is a hole penetrating radially outward through the flange 71.

Moreover, a seal portion 71B is provided between the insertion hole 74 in the flange 71 and the shaft 5C. The seal portion 71B is located at a position that is closer to the open end than the communication portion 71A is in the insertion hole 74.

As shown in FIGS. 6 and 7, the folded section 72 is a bellows-like portion, or an accordion-like portion, that links the flange 71 with the fitting portion 73.

The insertion hole 74 to receive the shaft 5C is provided inside the folded section 72.

As shown in FIGS. 6 and 7, the fitting portion 73 configures the throttle that controls the flow rate of chemical solutions in conjunction with the valve seat of the valve chamber 43.

The fitting portion 73 is provided with an attachment hole 73A that fixedly holds the tip of the shaft 5C, a contact surface 73B that contacts the valve seat 43A of the valve chamber 43, and a protrusion 73C that protrudes from the contact surface 73B and is inserted into the inlet channel 41.

As shown in FIGS. 3 and 7, the sensor 8 is a position sensor that is disposed on the substrate 9 to detect the protrusion 61 of the slider 6 as the protrusion 61 moves to the position of the sensor 8. In other words, the sensor 8 detects the position of the fitting portion 73 via the slider 6 and the shaft 5C for preventing deformation of the contact surface 73B and the valve seat 43A from being caused by abutment of the contact surface 73B on the valve seat 43A.

Description is given on a case in which the present embodiment is applied to a sensor for detecting the protrusion 61 upon entry of the protrusion 61 into the groove in the sensor 8. The sensor may be, but without particularly limited to, a known position sensor.

As shown in FIGS. 3 and 7, the substrate 9 is a substantially plate-like member that is disposed in a space defined by the upper cover 2 and the middle cover 3 and mounts the sensor 8.

Description moves on to a method of controlling the flow rate of chemical solutions for use with the flow-rate control valve 1 constructed as above.

First described is a condition in which the valve body 7 separates from the valve seat 43A to permit a chemical solution to pass through the flow-rate control valve 1.

As shown in FIGS. 1 and 6, the chemical solution flows into the flow-rate control valve 1 from the inlet channel 41, more specifically, flows into the valve chamber 43 from the inlet channel 41. The flow rate of the chemical solution that flows in the valve chamber 43 is changed based on the area of the throttle channel formed between the valve body 7 and the valve seat 43A.

The chemical solution that has entered the valve chamber 43 flows into the outlet channel 42 from the valve chamber 43 to be drained out of the flow-rate control valve 1.

If the evaporating gas of the chemical solution has a property to permeate through the constituent material of the valve body 7, as particularly shown in FIG. 7, the gas is likely to permeate through the thin folded sections 72 to go into the insertion hole 74.

As shown in FIGS. 3, 6, and 7, the gas that has entered the insertion hole 74 rises toward the upper cover 2 and enters the communication portion 71A, for the upper portion is sealed with the seal portion 71B. The gas that has entered the communication portion 71A is discharged out of the flow-rate control valve 1 through the communication portion 71A and the exhaust groove 38.

Meanwhile, as shown in FIGS. 6 and 7, the area of the throttle channel formed between the valve body 7 and the valve seat 43A is adjusted by the linear stepping motor 5A. In other words, the flow rate of chemical solutions that pass through the flow-rate control valve 1 is controlled in such a way that the valve body 7 is brought close to and apart from the valve seat 43A by means of the linear stepping motor 5A.

For instance, to decrease the flow rate of the chemical solution to pass through the flow-rate control valve 1, as shown in FIG. 3, control signals are fed from an external device to the linear stepping motor 5A through the cable 21 so that the shaft 5B and 5C are put off by the linear stepping motor 5A in a direction toward the lower cover 4.

As shown in FIGS. 3, 6, and 7, while being held with the slider 6 at a substantially central position of the guide 33, the shafts 5B and 5C move toward the lower cover 4 to cause the fitting portion 73 of the valve body 7 to approach the valve seat 43A. At this point, the folded section 72 linking the fitting portion 73 with the flange 71 is expanded.

Figure 8:
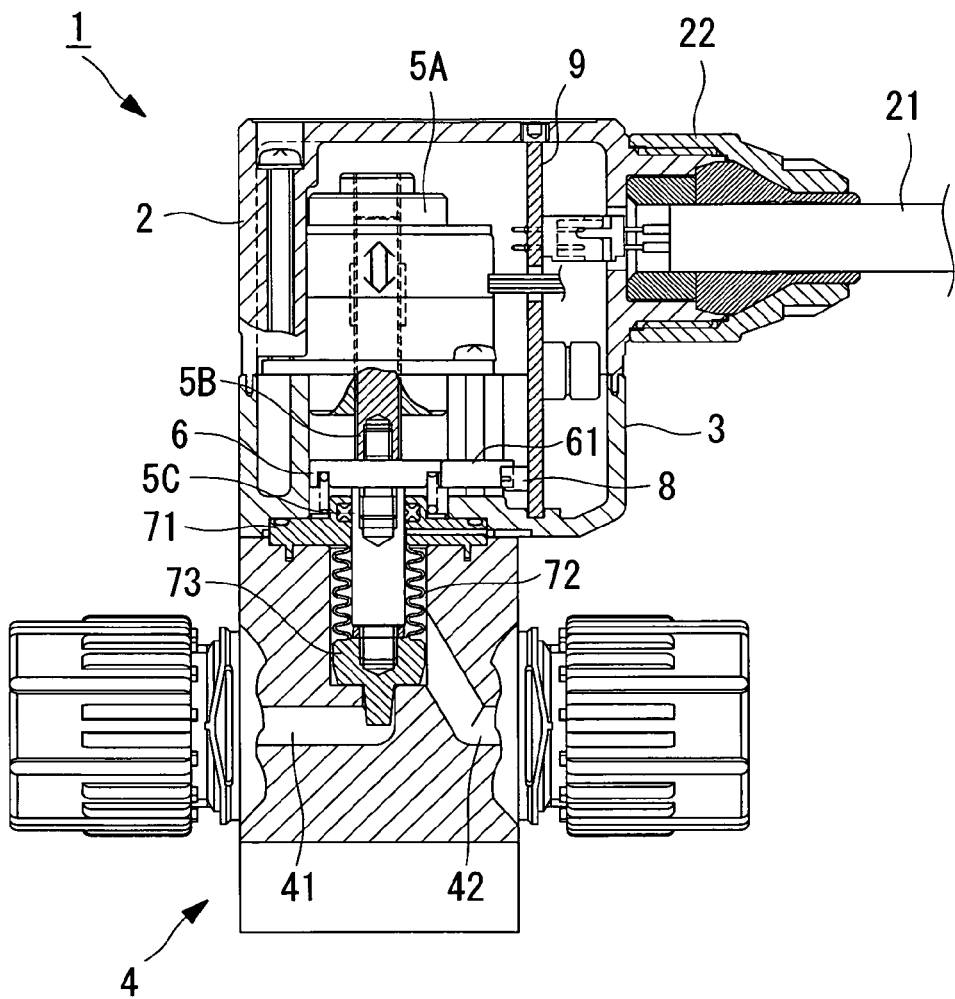
FIG. 8 is a schematic view illustrating a condition in which the valve body is in proximity to a valve seat in the flow-rate control valve of FIG. 1.
Figure 9:
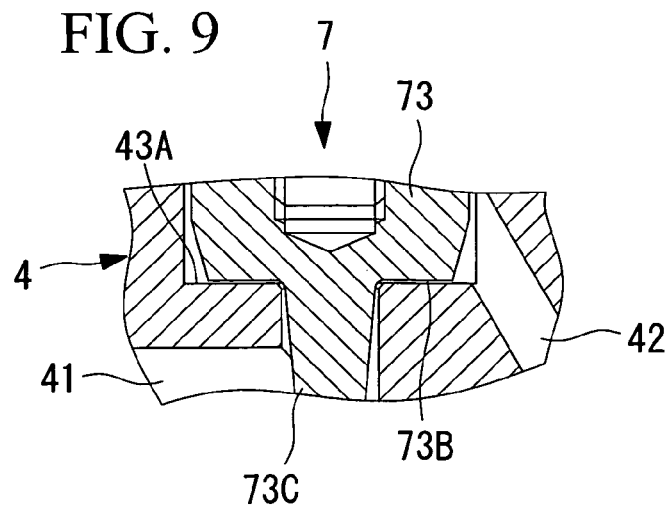
FIG. 9 is a partial enlarged view illustrating the condition of the valve body and the valve seat of FIG. 8.

FIG. 8 is a schematic view illustrating a condition in which the valve body comes close to the valve seat in the flow-rate control valve of FIG. 1. FIG. 9 is a partial enlarged view illustrating the condition of the valve body and the valve seat of FIG. 8.

As shown in FIGS. 8 and 9, when the valve body 7 moves to the proximity of the valve seat 43A, the area of the throttle channel formed between the valve body 7 and the valve seat 43A becomes almost zero, so that the flow rate of the chemical solution to pass through the throttle becomes substantially zero.

At this point, the valve body 7 does not abut against the valve seat 43A, and a minute gap is formed between the valve body 7 and the valve seat 43A.

Meanwhile, to increase the flow rate of the chemical solution to pass through the flow-rate control valve 1, the linear stepping motor 5A acts to raise the shafts 5B and 5C in a direction away from the lower cover 4.

Description is given next of calibration relevant to the position control of the valve body 7, i.e., position detection of the valve body 7.

Continuous control of the flow rate of chemical solutions by using the flow-rate control valve 1 leads to various cumulative errors resulting in increased errors between the position at which the valve body 7 is supposed to be installed for the position control of the valve body 7 and the actual installation position of the valve body 7. The errors not only impede accurate flow-rate control of chemical solutions by the flow-rate control valve 1 but also may cause interference between the valve body 7 and the valve seat 43A. If such interference occurs between the valve body 7 and the valve seat 43A, the valve body 7 and the valve seat 43A may deform, which will be hindrance to accurate flow-rate control of chemical solutions.

For this reason, the position of the valve body 7 is detected at predetermined timing to calibrate the position at which the valve body 7 is supposed to be installed for the position control of the valve body 7.

To perform calibration relevant to the position control of the valve body 7, the linear stepping motor 5A is fed with control signals so as to cause the valve body 7 to move close to the valve seat 43A. Then, the linear stepping motor 5A puts the shafts 5B and 5C and the slider 6 off toward the lower cover 4.

The slider 6 has the protrusion 61 that is inserted through the slit 35, and the slit 35 also moves toward the lower cover 4 in conjunction with the shafts 5B and 5C and the slider 6.

The sensor 8 detects the protrusion 61 as soon as the valve body 7 comes close to the valve seat 43A. The sensor 8 detects the protrusion 61 before the valve body 7 contacts the valve seat 43A.

For instance, assuming that 100% represents a condition in which the valve body 7 is separate from the valve seat 43A at a maximum extent and 0% represents a condition in which the valve body 7 contacts the valve seat 43A, the sensor 8 detects the protrusion 61 at a condition of several percent.

Based on the actual position of the valve body 7 thus detected, the installation position of the valve body 7, which position is for use in the position control of the valve body 7, is calibrated.

With the above structure, the valve body 7 is driven and controlled by the linear stepping motor 5A in a direction toward and away from the valve seat 43A. Accordingly, the number of components of the flow-rate control valve 1 is reduced in comparison with the case of using the method of converting the rotary driving force produced by, e.g., a stepping motor into the linear movement of the valve body 7. Thus, manufacturing cost reduction, along with improved ease of maintenance, is attained for the flow-rate control valve 1.

Since the communication portion 71A and the exhaust groove 38 are provided, the gas of the chemical solution that has permeated through the valve body 7 and entered the insertion hole 74 is easily released into the air through the communication portion 71A.

Since the valve body 7 is driven by the shafts 5B and 5C that are movably supported by the guide 33 and the slider 6, while the valve body 7 is moving in a direction toward and away from the valve seat 43A, the valve body 7 is prevented from moving in a direction other than that direction.

Accordingly, it is possible to prevent variation in area of the throttle channel formed between the fitting portion 73 and the valve seat 43A, which facilitates attainment of a desired level of accuracy in the flow-rate control of chemical solutions performed by the flow-rate control valve 1.

Meanwhile, for instance, consider a case of an integrally formed middle cover 3; in this case also, the portion of the guide 33 on which the slider 6 slides is formed independently of the outer wall 31 to have a substantially tubular shape. It is thus possible to suppress irregularity and deformation due to, e.g., thinning of the material.

The movement of the valve body 7 in the direction toward and away from the valve seat 43A will therefore not be hindered, which facilitates attainment of a desired level of accuracy in the flow-rate control of chemical solutions performed by the flow-rate control valve 1.

The calibration relevant to the position control of the valve body 7 is conducted by detecting the valve body 7 as the valve body 7 is in close proximity to the valve seat 43A, i.e., at a position where a predetermined gap still exists between the valve body 7 and the valve seat 43A. Thus, it is possible to prevent an excessive amount of chemical solutions from passing through the flow-rate control valve 1 during the calibration relevant to the position control of the valve body 7.

Meanwhile, since the sensor 8 detects the valve body 7 in the vicinity of the valve seat 43A, contact of the valve body 7 with the valve seat 43A is avoided. The valve body 7 and the valve seat 43A are therefore protected from deformation due to such contact, and the flow-rate control valve 1 can reliably perform flow-rate control reproducibly.

Figure 10:
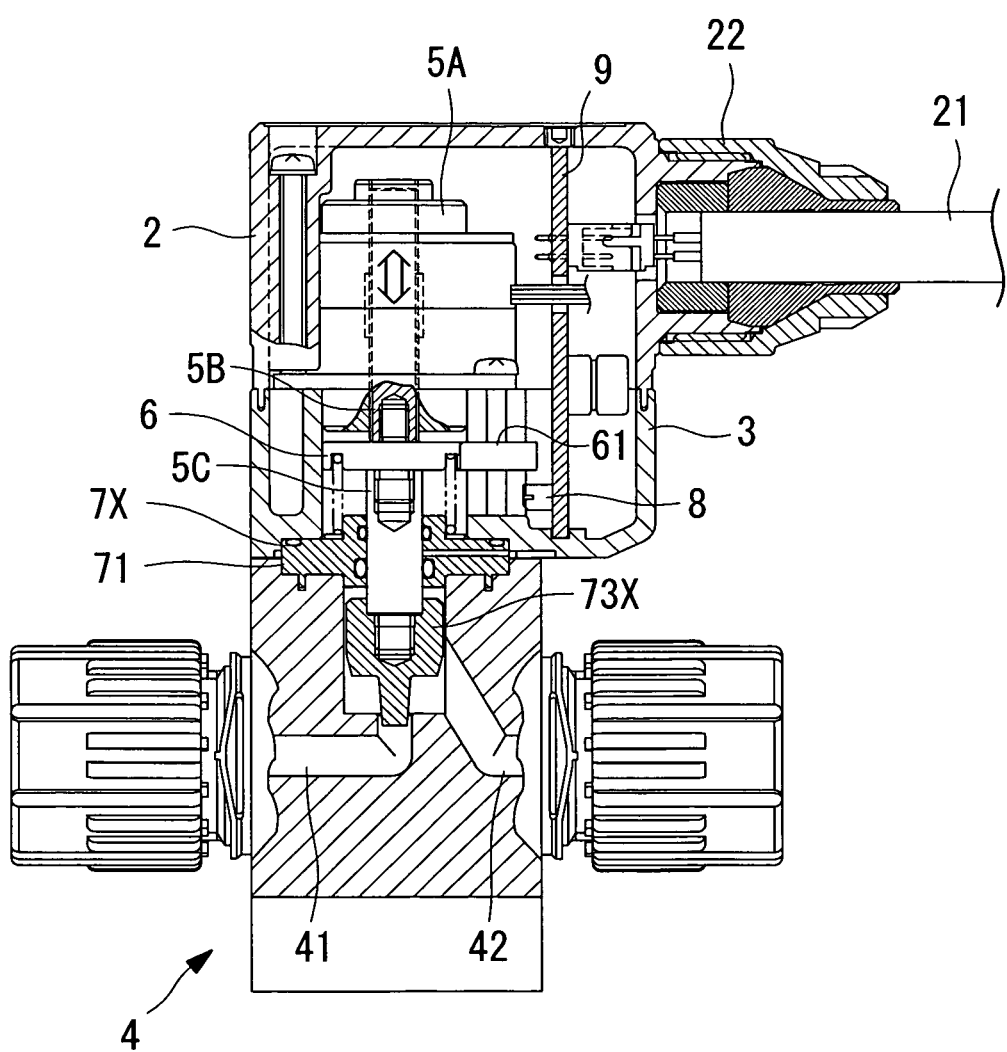
FIG. 10 is a general view illustrating another example of the valve body of FIG. 6.

FIG. 10 is a general view illustrating another example of the valve body of FIG. 6.

The example may be applied to the valve body 7 that is integrally formed of the flange 71, the folded sections 72, and the fitting portion 73 as described above, or may be applied to a valve body 7X as shown in FIG. 10 that is constructed from a discrete flange 71 and fitting portion 73X, and the valve body is not particularly limited. In other words, a member corresponding to the folded section 72 of the valve body 7 is not provided between the flange 71 and the fitting portion 73X of the valve body 7X.

The valve body 7X is easily formed in this structure, and manufacturing cost can be reduced.

Figure 11:
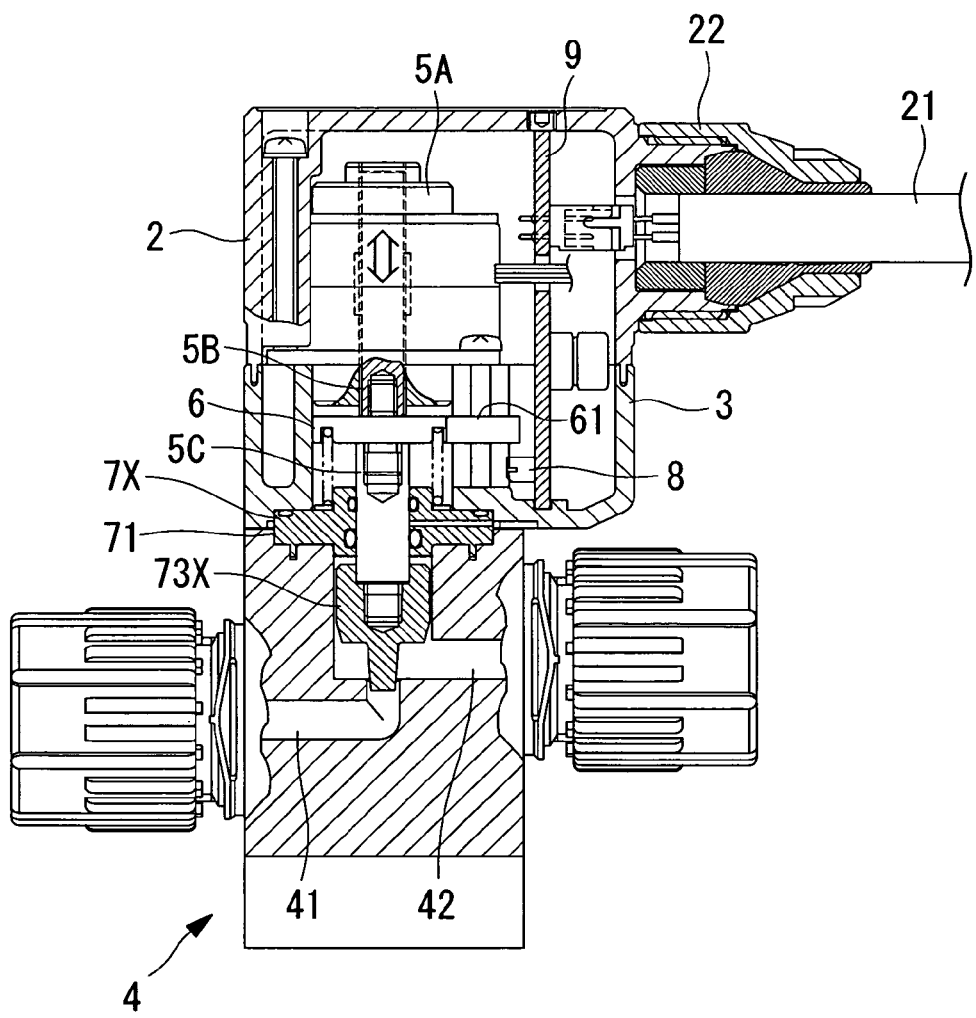
FIG. 11 is a general view illustrating another example of an outlet channel of FIG. 6.

FIG. 11 is a general view illustrating another example of the outlet channel of FIG. 6.

The outlet channel 42 may have a structure that slopes down from a side surface of the valve chamber 43 and then extends substantially horizontally as in the present embodiment, or alternatively, as shown in FIG. 11, the outlet channel may have a structure that extends substantially horizontally (rightward and leftward in FIG. 11) from a side surface of the valve chamber 43, and the outlet channel is not particularly limited.

The outlet channel 42 is easily formed to have these structures, and manufacturing cost can be reduced.

Second Embodiment

A second embodiment of the present invention is described below with reference to FIG. 12.

The basic structure of the flow-rate control valve of the present embodiment is the same as that of the first embodiment except for the structure of the middle cover. Thus, only the structure around the middle cover is described in the present embodiment with reference to FIG. 12, and other components and the like are not described.

Figure 12:
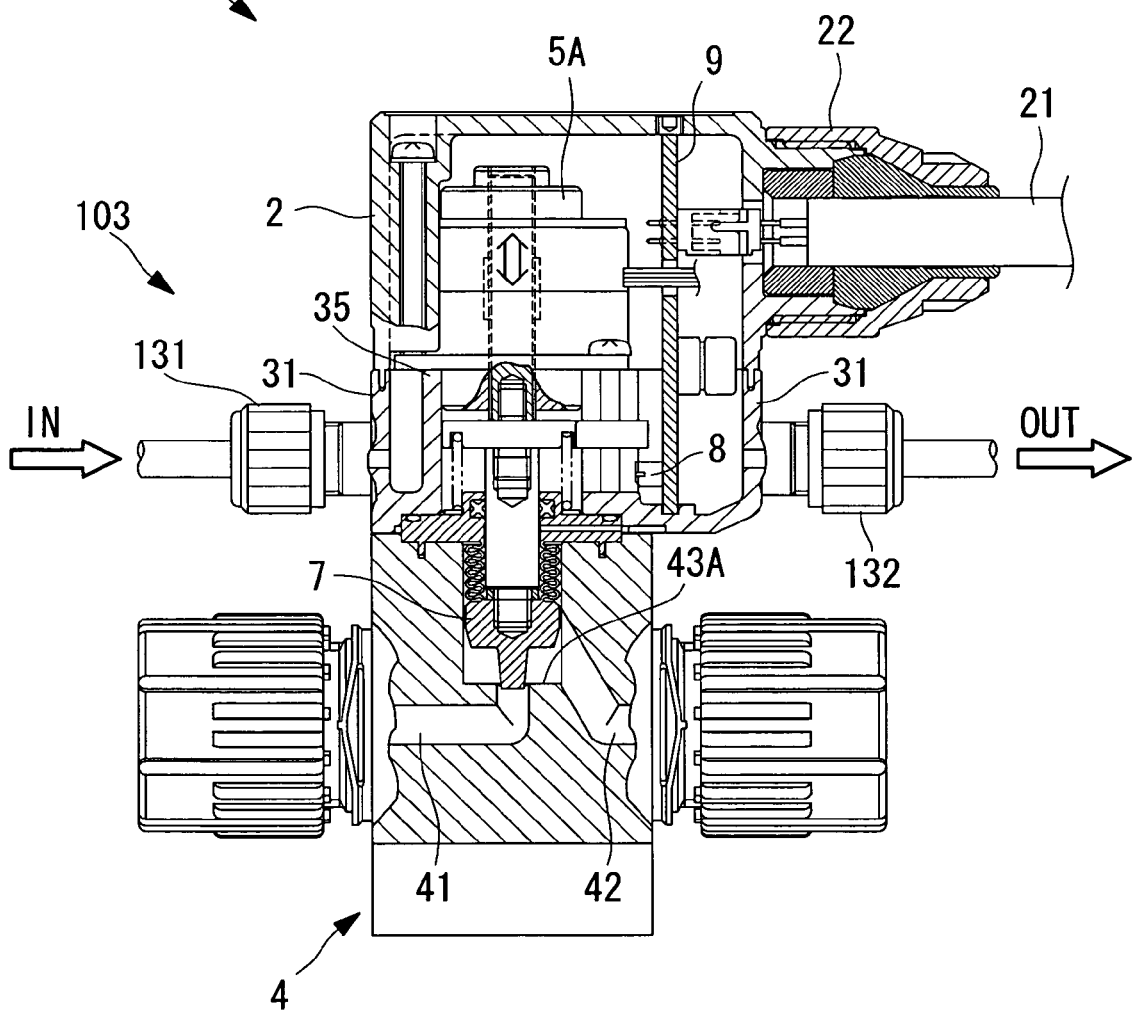
FIG. 12 is a cross-sectional view illustrating the overall structure of a flow-rate control valve according to a second embodiment of the present invention.

FIG. 12 is a cross-sectional view illustrating the overall structure of a flow-rate control valve according to the present embodiment.

The same components as those of the first embodiment are given like reference numerals, and description thereof is not given.

FIG. 12 shows a flow-rate control valve 101 including an upper cover 2, a middle cover (middle casing) 103, and a lower cover 4 that form the outer shape of the flow-rate control valve 101. The valve 101 also includes a linear stepping motor 5A, shafts 5B and 5C, a slider 6, a valve body 7, a sensor 8, and a substrate 9 that are all accommodated inside the covers 2, 103, and 4.

As shown in FIG. 12, the middle cover 103 is combined with the upper cover 2 to jointly define a space to house the shafts 5B and 5C, the slider 6, the substrate 9, the sensor 8, and the like.

The outer shape of the middle cover 103 is formed with a substantially quadrangular outer wall 31 including a supply portion 131 and a discharge portion 132. The supply portion 131 supplies air into the space defined by the upper cover 2 and the middle cover 103, whereas the discharge portion 132 discharges air from the space.

The supply portion 131 and the discharge portion 132 have a joint-like structure.

Description is given of the effects of the supply portion 131 and the discharge portion 132 in the flow-rate control valve 101 constructed as above.

As shown in FIG. 12, the supply portion 131 is supplied from the outside with an inert gas, such as $N_2$ gas, that does not contain gas of a chemical solution, and the inert gas flows inside the middle cover 103. More specifically, the inert gas flows from the supply portion 131 into the space between the outer wall 31 and a guide (guide portion) 33.

The inert gas that flows in between the outer wall 31 and the guide 33 circulates within the space defined by the upper cover 2 and the middle cover 103, so as to cool the components, such as the linear stepping motor 5A itself and the substrate 9, that are subject to the heat generated by the linear stepping motor 5A.

The inert gas that has circulated within the space is discharged to the outside from the discharge portion 132.

Since the above structure allows resin components disposed in the vicinity of the linear stepping motor 5A, such as the upper cover 2 and the middle cover 103, to be cooled, these components are protected from being affected by the heat emitted from the linear stepping motor 5A.

Further, the linear stepping motor 5A itself is cooled to a lower temperature.

As in the foregoing embodiment, the supply portion 131 and the discharge portion 132 that are provided on the middle cover 103 in the form of joints may be provided; alternatively, the discharge portion 132 may be provided as a through hole formed in the outer wall 31, and no particular limitation is posed.

The space defined by the upper cover 2 and the middle cover 103 is supplied with an inert gas from the supply portion 131 and is thus at higher pressure compared with the exterior of the space. Accordingly, external air will not flow into the space even in the case where the discharge portion 132 is simply a through hole.

The technical scope of the present invention is not limited to the foregoing embodiments, and various changes and modifications may be made without departing from the subject matter of the present invention.

For instance, the foregoing embodiments are described based on an example in which the components liable to contacting chemical solutions and evaporating gases of chemical solutions, such as the upper cover 2, the middle cover 3, the lower cover 4, the shaft 5C, and the valve body 7, are formed of polytetrafluoroethylene (PTFE; Teflon (registered trademark)) that is highly resistant to chemical solutions. The components may be formed of, but not particularly limited to, other materials including resins with high chemical resistance.

What is claimed is:

1. A flow-rate control valve comprising:
    a lower casing including a channel that leads a liquid and fluid,
    and a valve seat;
        a valve body that controls, in conjunction with the valve seat, a flow rate of the liquid and the fluid that pass through the channel;
    a linear stepping motor connected to a reciprocating drive part that controls and moves the valve body in a direction closer to or away from the valve seat linearly; and
    an upper casing housing the reciprocating drive part,
    wherein the valve body includes: a flange coupled by a bellows to a fitting portion providing selective engagement in which the valve body including the fitting portion is engaged with the valve seat in various positions to vary the flow rate; and an insertion hole that receives a shaft body extending from the reciprocating drive part, and
    wherein the flange has a substantially disk shape; and a communication portion extending through inside the flange, and the communication portion linking the inside of the insertion hole with air.

2. The flow-rate control valve according to claim 1, wherein the reciprocating drive part includes:
    a shaft body extending toward the valve body; and
    a substantially disc-shaped sliding part extending in a direction that crosses the shaft body, and a middle casing including guide portion having a substantially tubular shape, provided between the lower casing and the upper casing,
    wherein the guide portion is fitted with the reciprocating drive part to movably support the shaft body and the sliding part in a direction toward and away from the valve seat, and the guide portion includes a portion on which the sliding part slides, the portion being provided independently of the middle casing; and a spring extends between the flange and the sliding part.

3. The flow-rate control valve according to claim 1, further comprising a detection part that detects the valve body as the valve body comes close to the valve seat.

4. A flow-rate control valve comprising:
    a casing defining a flowpath having a valve seat;
    a valve body having: a fitting portion that interacts with the valve seat to control a flow rate of a fluid passing through the flowpath; a flange connected to the fitting portion by a bellows; a substantially disc-shaped sliding part; a spring extending between the flange and the sliding part; and a reciprocating drive shaft extending through the sliding part, the spring and the flange to form an end with the fitting portion mounted thereon, wherein the spring urges the fitting portion in a direction away from the valve seat by the fitting portion being coupled to the sliding part through the reciprocating drive shaft; and
    a linear stepping motor directly connected to the reciprocating drive shaft that controls and moves the valve body towards and away from the valve seat linearly,
    wherein the fitting portion contacts the valve seat to create a closed position and moves away from the valve seat to create a plurality of open positions and thereby vary the flow rate,
    as the drive shaft moves between the closed position and the open position, the spring expands and contracts to minimize hysteresis of the shaft by keeping the sliding part at a substantially central position,
    in the closed position, the fitting portion contacts the valve seat, the bellows is unfolded, and the spring is compressed to provide a maximum urging force for facilitating highly accurate positional control of the fitting portion near the closed position, and
    in the open positions, the fitting portion does not contact the valve seat, the spring is at least partially expanded, and the bellows is at least partially folded.

* * * * *